(12) United States Patent
Jouppi et al.

(10) Patent No.: US 8,627,213 B1
(45) Date of Patent: Jan. 7, 2014

(54) CHAT ROOM SYSTEM TO PROVIDE BINAURAL SOUND AT A USER LOCATION

(75) Inventors: Norman Paul Jouppi, Palo Alto, CA (US); Subramoniam N. Iyer, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1417 days.

(21) Appl. No.: 10/915,939

(22) Filed: Aug. 10, 2004

(51) Int. Cl.
  *G06F 3/00* (2006.01)
  *G06F 3/048* (2013.01)
  *G06F 15/16* (2006.01)
  *G06T 15/00* (2011.01)
  *G06T 17/00* (2006.01)

(52) U.S. Cl.
  USPC ........... 715/758; 715/753; 715/757; 715/848; 345/419; 345/428; 709/204; 709/205; 709/206; 709/207

(58) Field of Classification Search
  USPC ........... 715/753, 757, 758, 848; 709/204–207
  See application file for complete search history.

(56) References Cited

U.S. PATENT DOCUMENTS

| | | | | | |
|---|---|---|---|---|---|
| 5,664,021 | A | * | 9/1997 | Chu et al. | 381/92 |
| 5,736,982 | A | * | 4/1998 | Suzuki et al. | 715/706 |
| 5,889,843 | A | * | 3/1999 | Singer et al. | 379/202.01 |
| 5,999,208 | A | * | 12/1999 | McNerney et al. | 348/14.08 |
| 6,028,608 | A | * | 2/2000 | Jenkins | 345/619 |
| 6,041,343 | A | * | 3/2000 | Nguyen et al. | 709/203 |
| 6,111,957 | A | * | 8/2000 | Thomasson | 381/15 |
| 6,188,769 | B1 | * | 2/2001 | Jot et al. | 381/63 |
| 6,195,099 | B1 | * | 2/2001 | Gardiner | 345/426 |
| 6,327,567 | B1 | * | 12/2001 | Willehadson et al. | 704/270 |
| 6,453,336 | B1 | * | 9/2002 | Beyda et al. | 709/204 |
| 6,559,863 | B1 | * | 5/2003 | Megiddo | 715/753 |
| 6,577,738 | B2 | * | 6/2003 | Norris et al. | 381/77 |
| 6,767,287 | B1 | * | 7/2004 | Mcquaid et al. | 463/42 |
| 6,772,195 | B1 | * | 8/2004 | Hatlelid et al. | 709/204 |
| 6,850,496 | B1 | * | 2/2005 | Knappe et al. | 370/260 |
| 6,856,802 | B1 | * | 2/2005 | Kinnunen et al. | 455/425 |
| 7,124,372 | B2 | * | 10/2006 | Brin | 715/751 |
| 7,310,802 | B2 | * | 12/2007 | Dani et al. | 718/105 |
| 7,587,512 | B2 | * | 9/2009 | Ta et al. | 709/233 |
| 2001/0055398 | A1 | | 12/2001 | Pachet et al. | |

(Continued)

FOREIGN PATENT DOCUMENTS

WO   WO99/62189 A2 * 12/1999
WO   WO02/35844 A2 * 5/2002

OTHER PUBLICATIONS

Fernanda B. Viegas and Judith S. Donath, Chat Circles, 15-2 -May 1999, MIT Media Lab.*

(Continued)

*Primary Examiner* — Matt Kim
*Assistant Examiner* — Yongjia Pan (57) ABSTRACT

A chat room system is provided that includes sending a signal representative of a sound at a first user location to a second user location and establishing, in a chat room, a virtual first user location and a virtual second user location. It further includes establishing the orientation of a listening system at the second user location and processing the signal, using the orientation of the listening system, at a plurality of levels of realism to provide a binaural sound at the second user location having an analogous spatial relationship between the second user location and the first user location as the virtual spatial relationship between the virtual second user location and the virtual first user location.

22 Claims, 3 Drawing Sheets

(56) References Cited

U.S. PATENT DOCUMENTS

| | | | | |
|---|---|---|---|---|
| 2002/0112004 | A1* | 8/2002 | Reid et al. | 709/205 |
| 2003/0026207 | A1* | 2/2003 | Loguinov | 370/235 |
| 2003/0067877 | A1* | 4/2003 | Sivakumar et al. | 370/232 |
| 2003/0107478 | A1* | 6/2003 | Hendricks et al. | 340/311.2 |
| 2003/0236835 | A1* | 12/2003 | Levi et al. | 709/204 |
| 2004/0111479 | A1 | 6/2004 | Borden et al. | |
| 2004/0150646 | A1* | 8/2004 | Oka | 345/502 |
| 2005/0033806 | A1* | 2/2005 | Harvey et al. | 709/204 |
| 2005/0088981 | A1* | 4/2005 | Woodruff et al. | 370/260 |
| 2005/0157891 | A1* | 7/2005 | Johansen | 381/103 |
| 2006/0045274 | A1* | 3/2006 | Aarts et al. | 381/17 |
| 2006/0056638 | A1* | 3/2006 | Schobben | 381/17 |
| 2006/0212147 | A1* | 9/2006 | McGrath et al. | 700/94 |
| 2007/0294387 | A1* | 12/2007 | Martin | 709/224 |
| 2011/0258507 | A1* | 10/2011 | Rideout | 714/746 |

OTHER PUBLICATIONS

Paul M. Aoki, Matthew Romaine, Margaret H. Szymanski, James D. Thornton, Daniel Wilson, and Allison Woodruff, The Mad Hatter's Cocktail Party: A Social Mobile Audio Space Supporting Multiple Simultaneous Conversations, Apr. 5-10, 2003, ACM.*

3D Audio Rendering and Evaluation Guidelines, Jun. 9, 1998, MIDI Manufactures Association.*

Thomas McGuire, Max Payne tweak guide, Aug. 22, 2001, 9 pages.*

Interactive 3D Audio Rendering Guidelines Level 2.0, Sep. 20, 1999, MIDI Manufactures Association, 29 pages.*

Thomas Funkhouser, Jean-Marc Jot, Nicolas Tsingos, "Sounds Good to Me!", 2002, 43 pages.*

Nicolas Tsingos, Emmanuel Gallo and George Drettakis, Perceptual Audio Rendering of Complex Virtual Environments, Jul. 19, 2004, 11 pages.*

Thomas Funkhouser, Patrick Min, Ingrid Carlbom, Real-Time Acoustic Modeling for Distributed Virtual Environments, 1999, 11 pages.*

Steve DiPaola, David Collins, A 3D Virtual Environment for Social Telepresence, Mar. 24-27, 2002, 6 pages.*

J. H. Rindel, The Use of Computer Modeling in Room Acoustics, 2000, 6 pages.*

Malcolm J. Crocker, Handbook of Acoustics, Feb. 23, 1998, 2 pages.*

A.C.C Warnock, Reverberant Noise Control in Rooms Using Sound Absorbing Materials, Jun. 1980, 8 pages.*

Kyungmin Lee, Dongman Lee, A Scalable Dynamic Load Distribution Scheme for Multi-Server Distributed Virtual Environment Systems With Highly-Skewed User Distribution, 2003, 9 pages.*

Roger Zimmermann, Beomjoo Seo, Leslie S. Liu, Rahul S. Hampole and Brent Nash, AudioPeer: A Collaborative Distributed Audio Chat System, 2004, 7 pages.*

* cited by examiner

CHAT ROOM SYSTEM TO PROVIDE BINAURAL SOUND AT A USER LOCATION

BACKGROUND

1. Field of the Invention

The present invention relates generally to chat room systems.

2. Background of the Invention

With the increasing use of digital subscriber lines (DSL), satellite and cable modems, dial-up modems, and the 802.11(a), (b), and (g) "wi-fi" devices, Internet access via "web pages" found on the World Wide Web, or the "web" has been constantly increasing. The speed of data transmission is such that rapid text, audio, and video communications are now possible.

One popular communication application supported by the Internet and available on the web is the "chat room". A chat room is basically an electronic bulletin board where "posts" or messages for anyone accessing or "in" the chat room are communicated substantially in real time. Thus, in a chat room, participants interested in a particular topic (often reflected in the name of the chat room) can electronically "chat" with other users.

Current chat room audio systems are based on a single channel with a speakerphone-like model. People are intelligible to others just if one person at a time is speaking. This is unlike a real room where multiple people can be speaking simultaneously and still be understood. There are a couple of reasons for this and resulting disadvantages and problems. First, current telephone technology provides just a single channel. However, it is well known that by using binaural (i.e., utilizing both ears) audio, up to a 13 dB increase in effective signal-to-noise may be obtained through human perceptual abilities such as the "Cocktail Party Effect". At a cocktail party, people with normal hearing can use both their ears and brain to selectively attend to and participate in multiple simultaneous conversations. In contrast, when multiple speakers are speaking over a single audio channel, the result is usually completely unintelligible (i.e., unless one speaker is much louder than the others).

Second, conference phones often resort to half-duplex modes to reduce echoes. This can make taking turns in conversations awkward if participants from multiple locations start speaking at about the same time.

SUMMARY OF THE INVENTION

The present invention provides a chat room system that includes sending a signal representative of a sound at a first user location to a second user location and establishing, in a chat room, a virtual first user location and a virtual second user location. It further includes establishing the orientation of a listening system at the second user location and processing the signal, using the orientation of the listening system, at a plurality of levels of realism to provide a binaural sound at the second user location having an analogous spatial relationship between the second user location and the first user location as the virtual spatial relationship between the virtual second user location and the virtual first user location.

Certain embodiments of the invention have other advantages in addition to or in place of those mentioned above. The advantages will become apparent to those skilled in the art from a reading of the following detailed description when taken with reference to the accompanying drawings.

DESCRIPTION OF THE PREFERRED EMBODIMENT

In the following description, numerous specific details are given to provide a thorough understanding of the invention. However, it will be apparent that the invention may be practiced without these specific details. In order to avoid obscuring the present invention, some well-known systems are not disclosed in detail.

Figure 1:
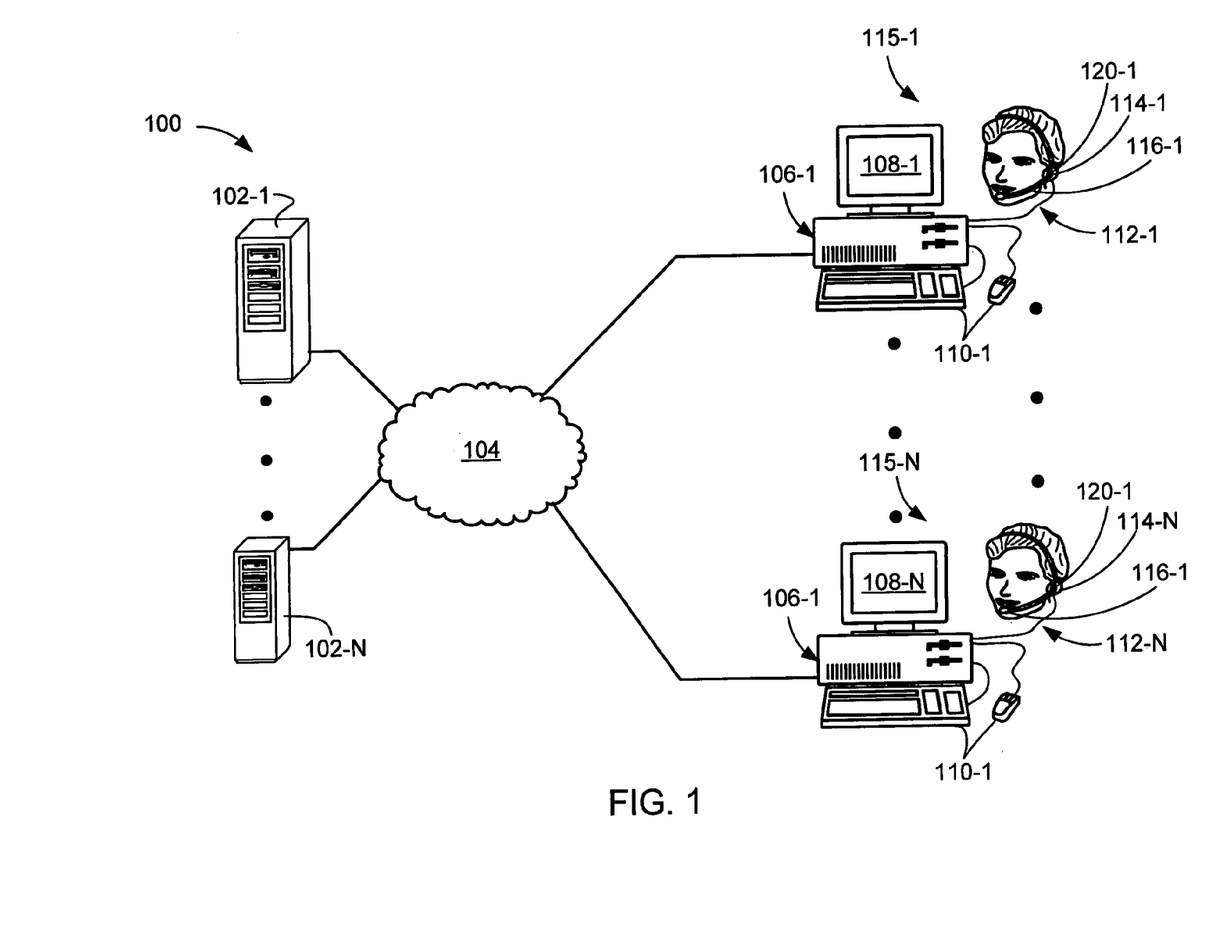
FIG. 1 a view of a chat room spatial audio system according to an embodiment of the present invention.

Referring now to FIG. 1, therein is shown a chat room spatial audio system 100. The chat room spatial audio system 100 includes one or more computer systems, such as Internet host servers 102-1 through N. The Internet host servers 102-1 through N are connected to a communications cloud 104. The communications cloud 104 represents various communication systems and networks including DSL, satellite and cable modems, dial-up modems, and wi-fi Internet connections, etc. A number of computer systems, such as personal computers 106-1 through N, are connected to the communications cloud 104.

Each of the personal computers 106-1 through N has respective graphical user interfaces (GUIs) 108-1 through N, and control systems 110-1 through N, such as keyboards, mice, joysticks, etc. Each of the personal computers 106-1 through N is for a user 112-1 through N, respectively. Each of the users 112-1 through N is respectively provided with listening systems 114-1 through N at user locations 115-1 through N.

The listening systems 114-1 through N could each be multiple loud speakers and can allowing listening to chat room talk in a home entertainment room, but in one embodiment the listening systems 114-1 through N include a communication system that uses inexpensive, light weight headsets, which are provided with audio headphones and sending systems, such as noise-canceling boom microphones 116-1 through N, respectively.

The listening systems 114-1 through N are provided with tracking systems 120-1 through N, respectively, which establish orientation, such as azimuth, and optionally elevation and/or roll, of the listening systems 114-1 through N, respectively.

In the chat room spatial audio system 100, geographically distributed users 112-1 through N verbally communicate with each other much as if they were in a shared room. Each user 112-1 through N respectively wears a listening system 114-1 through N, which is connected to the personal computers 106-1 through N, respectively.

The voice of each speaking user 112-1 through N is sent through the communications cloud 104 to at least one of the Internet host servers 102-1 through N, which simulates, with variable degrees of realism, the sound field that would occur if all the users 112-1 through N were actually in a single shared room; i.e., in a virtual chat room (referred to as a "chat room").

In embodiments of the present invention, it has been discovered that the Internet host servers 102-1 through N can be programmed to operate with a number of levels of realism as far as the subjective reality of the users 112-1 through N are concerned. Each increased level of realism requires more computational resources from the Internet host servers 102-1 through N, but generally does not require more bandwidth between the users 112-1 through N and the Internet host servers 102-1 through N.

In another embodiment, where the Internet host server 102-1 is being used, it may choose its level of realism based on the number of active users in the chat room and the resulting load. For example, the fewer the speaking users, the more accurately the sound field in the chat room will be simulated, and vice versa.

It has been discovered that three levels of realism singularly or in combination provide an excellent method to balance between maximum realism and optimal use of computer resources.

In a first level of realism, the signal to a listening system would be processed using a frequency-independent sound model; i.e., frequencies in the model are attenuated or delayed by the same amount. A number of different computation methods may be used singularly or in combination in the frequency-independent sound model to provide a binaural listening experience that conveys to the listening user the perception of actual physical presence in the chat room.

One method uses interaural time delay (ITD), which gives the time difference between a user's ears as a function of the angle of the user's head to the sound source, such as the user 112-1 to the user 112-2 who is virtually positioned to one side. It can be either calculated from approximation or found from a precalculated look-up table. The angle of the user's head would be established using the tracking system 120-1 and/or the control systems 110-1

A second method uses interaural level difference (ILD), which using the level difference based on the angle (usually just azimuth, but also possibly elevation) between a user's head and the sound source, such as the user 112-1 virtually standing listening to the user 112-2 who is virtually seated. The ILD can be computed from a simple approximation.

A third method uses angle-dependent output level (ADOL) of the user's voice calculated to represent the change in perceived volume of second user turning his/her head. For example, this reproduces to the user 112-1, a user 112-2 who is virtually directly speaking towards the user 112-1 as being louder than the user 112-3, who is virtually speaking directly away from the user 112-1. The ADOL is calculated from a simple approximation based on the user's mouth angle relative to the virtual direction to the user 112-1.

A fourth method uses distance level dependence (DLD), which can be calculated by modeling the spread of acoustic energy with distance resulting in virtual near users 112-2 and 3 being perceived by the user 112-1 as louder than virtually distant users 112-4 and N. The spread of acoustic energy generally results in a $1/r^2$ level dependence in the near field and a less steep falloff with distance such as $1/r^{3/2}$ in enclosed spaces with floors and ceilings at distances that are large compared to the floor to ceiling spacing. In these further field situations, some of the sound energy reflects off the floors and ceilings (as well as some being absorbed) and thus can contribute to the sound perceived by the user 112-1. The actual exponent in the enclosed far field case is a function of the chat room acoustics. The room acoustics could also be a function of the number of users 112-1 through N in the chat room.

The perceptual shortcomings of the first level are that there may be front/back confusion with sounds generally appearing to be coming from the listener's left or right ear or somewhere between, so the sounds appear internal to the listener's head. In contrast, at higher levels of realism there is usually good externalization, except when they are close to the median plane. Also, a horizontal plane is used instead of head elevation so it is not possible to determine elevational differences in the sound.

An even simpler level of realism is possible by just taking the sum of contributions of the nearest N speakers to the listener.

The advantage of the first level is that the relative computational demands are low. For example, the largest number of participants in the chat room could be handled at this base level of computational demand.

In a second level of realism, the signal to a listening system would be processed using a frequency-independent sound model and a frequency-dependent sound model; i.e., frequencies in the model are attenuated or delayed according to the frequency. A number of different computation methods may be used singularly or in combination in the frequency-dependent sound model to provide a binaural listening experience that conveys to the listening user an even more realistic perception of actual physical presence in the chat room than the first level of realism.

One method uses head-related transfer functions (HRTFs), which are transfer functions which vary with both azimuth and elevation angle of the sound incident on the user's ears. These functions are dependent on the external structure (pinnae) of the user, and each person has a unique ear structure. However, if users are given the ability to select between several different HRTFs, they can usually find one that works quite well, especially if the HRTFs can be tuned with fixed elevation offset angles. This fixed elevation offset could be input by adjusting a thumbwheel either on a joystick or in a thumbwheel-like control as part of the control systems 110-1 through N.

The HRTF calculations use discrete convolution (as used in digital signal processing) where for each output a set of contiguous input waveform samples are each multiplied by different filter coefficients and summed. Lesser levels of realism are possible by reducing the accuracy of the convolutions.

A second method uses human voice transfer functions (HVTFs), which are transfer functions which vary with both azimuth and elevation angle of a speaker's voice. People communicate more easily when facing each other because speech is not radiated uniformly outwardly. More speech energy is radiated forward than to the sides or rear.

A third method uses distance sound transmission transfer functions (DSTTFs), which vary with the distance between a speaker and a user. However, for distances involved in a moderate size chat room, these transfer functions are generally not significant unless the speaker and the user are in different chat rooms.

The perceptual shortcoming of the second level is that the median plane is located inside the head.

The relative computational demands are equal to or higher than the first level of realism, and could arbitrarily be set at approximately 100× the first computational demand level.

In a third level of realism, the signal to a listening system would be processed using a frequency-independent sound model, a frequency-dependent sound model, and a reflection sound model; i.e., sound reflections from structures and objects are calculated. A number of different computation methods may be used singularly or in combination in the reflection sound model to provide a binaural listening experience that conveys to the listening user the most realistic perception of actual physical presence in the chat room.

A first method uses the reflection of sound in the chat room in addition to the direct waveform of a speaking user's voice. Reflections of a speaking user's voice are computed based on the relative position and orientation of each speaking user and listening user pair plus the virtual acoustic characteristics of the chat room floor, walls, and ceiling.

A second method uses the reflection of sound off the human torso for the listening and speaking users.

A third method uses multiple reflections where the initial speech wavefront will be followed by more and more reflection wavefronts coming from different directions around the listening user, each one convolved by its own HRTF specific to its incoming azimuth and elevation angles.

The third level has no perceptual shortcomings although the level of realism could be reduced to reduce computational loading by reducing the accuracy of the reflection profile. However the computational demands would be much greater, and could arbitrarily be set at approximately 1000× greater than the first level computational demand level.

The first level of realism is characterized by relatively low computational demands, and simulates four effects. For each ear of each user, the voice stream of every other user who is speaking is merely offset in time using the ITD calculation and multiplied by a combined scale factor resulting from the ILD, ADOL, and DLD. The time offset is a change in sample index position. The sample index position is the location of the data being used in a discrete stream of samples. Given the samples are a time T apart, to simulate a delay of time 2T, samples from two places earlier in the stream than normally used are used to effect the delay. Since this doesn't involve computation, but just indexing the sample stream differently, it has basically no computational cost and does not require any computation on the sound signals unless the delay is changing (in which case a limited amount of resampling or interpolation is performed). Since the ITD, ILD, ADOL, and DLD change very slowly, computation of these scale factors can be cached and hence results in insignificant computational loads.

Thus, the first level of realism requires one simple multiplication per each combination ear/speaking user in the room, plus one addition per each combination ear/speaking user beyond one per ear to the sum of the contributions of all speaking users. For example, the first level of realism could support a hundred listening users and ten speaking users per chat room using a single Internet host server 102-1.

As a lesser level of realism, if there are a large number of speaking users and many listening users in the chat room, just the contributions of the N nearest users of each user could be summed for a variable number of N. This prevents the server load from becoming excessive and causing a system failure during a situation such as 99 users simultaneously singing happy birthday for one user.

The first level of realism provides substantial improvement over a single audio channel speakerphone system, however it can suffer from two perceptual shortcomings.

First, it is difficult to distinguish sounds as coming from the front or back of the user. Also, sounds emanating from along the median plane centered on the user's head appear to be coming from inside the user's head due to front/back confusion.

Second, no perception of elevation angles between the speaking users and the user can be conveyed to the user. This is not a significant limitation for two-dimensional chat rooms, but becomes more of an issue with three-dimensional virtual chat room environments. All of these shortcomings can be remedied by higher, more accurate realism levels, but with attendant higher computational demands.

The second level uses computations from the first level and introduces HRTFs, HVTF, and/or DSTF sound models. The second level requires convolving each signal coming into a user's ear with a HRTF, which requires a large number of multiplications and additions (e.g., 200 multiplications and additions) for each sample point. However, HRTFs can also simulate elevation differences between speaking users and listening users, and reduce front/back confusion. However, speaking users directly in front of or behind the listening user are still usually perceived inside the user's head.

The third level of realism uses computations from the first and second levels and introduces a reflection sound model. The third level requires calculating the initial direct waveform of a speaker's voice as simulated in the first and second levels and the reflections of the room and objects in the room such as the users. This simulates full realism but has very high computational demands, since potentially tens or even hundreds of reflections could each require hundreds of computations per sample point for the HRTF calculations.

Minor adjustments to realism at the third level can be selected by varying the number and accuracy of the reflections that are modeled.

In one embodiment of the present invention, the users 112-1 through N use the listening systems 114-1 through N so the possibilities for echoes are limited to a speaking user's voice traveling into the chat room and back to the speaking user's own ears. In this case, simple echo cancellation with exponentially-weighted attack and decay time constants has been found to be sufficient. These time constants locally attenuate signals to the listening systems 114-1 through N in proportion to the volume of the signals received from their own microphones 116-1 through N. The amount of attenuation when a user 112-1 speaks may be controlled through the GUI 108-1 using the control system 110-1.

In another embodiment, the effect of the listening systems 114-1 through N may be simulated by one or more pairs of loud speakers around the user 112-1. However, the range of user movement allowed while perceiving spatial audio with the loud speakers is limited to a small "sweet spot". Systems need to be provided feedback and echo cancellation to avoid the microphone directly hearing the output of the speakers as well as the user. Also, a noise-canceling microphone 116-1 or directional microphone is spotted on the user's mouth to avoid picking up ambient sound from the user's location. The ambient sound would be background noise due to televisions, non-user speakers, and other noise sources collocated with the user.

Figure 2:
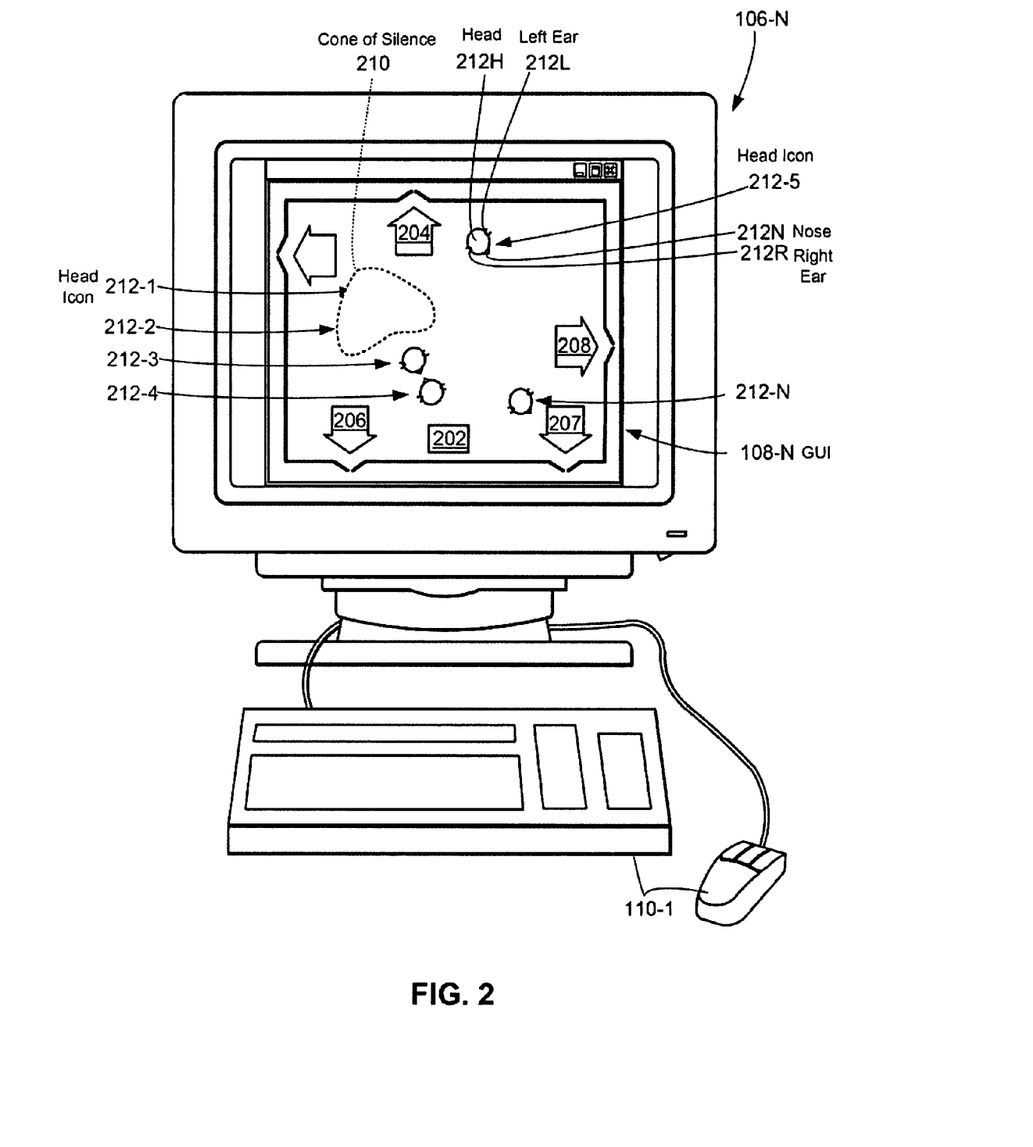
FIG. 2 is a personal computer of the chat room spatial audio system.

Referring now to FIGS. 1 and 2, therein are shown the personal computer 106-N of FIG. 1 having GUI 108-N of the chat room spatial audio system 100. A virtual chat room 200 appearing on the GUI 108-N is labeled with a name 202, for example a city location. Around the periphery of the chat room 200 are a number of labeled entries or doorways leading to other chat rooms represented by doorways 204 through 208. The other chat rooms can be for other topics, locations, etc.

Each user 112-1 through N in the chat room 200 is represented by a corresponding head icon 212-1 through N showing the user's name and particular features. The head icons 212-1 through N on the GUI 108-N represent the respective virtual user locations of the users 112-1 through N in the chat room 200 and are established by the users 112-1 through N using their respective control systems 110-1 through N. The virtual relationships for the three levels of reality disclosed for FIG. 1 are shown in FIG. 2

Each head icon shows a facing direction. For example, the head icon 212-5 shows left and right ears 212L and 212R, and a nose 212N (and hence the mouth location) on the head 212H of the user 112-5. In addition, each of the users 112-1 through N can establish location and orientation for themselves by moving and/or rotating their respective head icons 212-1 through N within the chat room 200, as well as through the various doorways 204 through 208 of the chat room 200, or jump directly into different chat rooms through other features of the GUI 108-1 and their respective control systems 110-1 through N. In one embodiment, the user's own head icon is drawn in bold so as to allow it to be distinguished from the other users' head icons.

Each of the tracking systems, such as the tracking system 120-1 allows the head icon 212-5 with the ears 212L and 212R, and the nose 212N, to be oriented so that the user 112-5 can turn his head icon 212-5 in the chat room 200 merely by turning his own physical head. Orientation sensing may be provided by many different means, including electronic compass circuits and electronic gyroscopes. More advanced systems can put the user's head elevation angle as well as rotations in azimuth (i.e., pitch and yaw). The orientation of the user's head as shown in the GUI 108-1 will be automatically updated with changes in the orientation of the user's head. This can help reduce confusion along the median plane of the user's head by enabling the user 112-1 to rotate his/her head orientation slightly in the virtual chat room 200 so that the sound source is no longer directly on the median plane. This ability is even used in real situations, when people cock their heads to better locate a sound source.

Usually users can just hear what is going on in the chat room in which they are located, however, it has been discovered that it is possible to model sound leakage through the doorways 204 through 208 into the chat room 200 to provide greater realism. Sound leakage through doorways 204 through 208 can be modeled simply by setting up the speaking users in the adjoining chat rooms as though they were on the other side of the doorways 204 through 208. For example, the speaking users (or an arbitrarily set number of speaking users in the case of many speaking users) in the chat room on the other side of the doorway 204 would be treated as though they were on the other side of the doorway 204. Factors, such as the distances of the speakers to the doorways, the angle of their heads to the doorway, etc., could be factored in and their sounds combined, attenuated, and sent into the chat room 200 as though there were a single speaking user at the doorway 204. Sounds below a threshold value would be completely ignored (with gradual fade-in and fade-out), reducing computational demands. Furthermore, sounds propagating into the chat room 200 through the doorway 204 would not be propagated out through other doorways 205 through 208 so as to reduce computational spillover.

A system has been discovered for providing selective private conversations in a chat room. The system has been dubbed the "cone of silence" from the 1965 TV show "Get Smart". When a user 112-1 wants to have a private conversation with one or more other users, such as the users 112-2 and 112-3, the user 112-1 uses the GUI 108-1 and the control system 110-1 to either select the other users or designate an area of privacy, or cone of silence 210.

The unselected users may either vanish or be distinguished in another fashion from the viewpoint of the users in the cone of silence 210, and/or the users in the cone of silence 210 vanish or otherwise are distinguished from the viewpoint of the users not selected to be in the cone of silence 210. Basically, a private chat room is formed for the selected users. The users in the cone of silence 210 cannot hear other users outside the cone of silence 210 and vice versa.

In further embodiments, where there are three-dimensional user interfaces, similar to virtual worlds in virtual reality or a 3D user environment, the chat room spatial audio system 100 can easily be adapted to three dimensions by use of vertical orientation tracking.

With regard to the architecture used for the chat room 200, each user 112-1 through N may require anywhere from 32 Kb/sec to 200 Kb/sec bandwidth, depending on the available bandwidth of their Internet connection, the sound quality of codecs used, and the server system resources available.

In the preferred embodiment, each chat room simulation runs on its own Internet host server, although multiple rooms with few users may be simulated by a single Internet host server. If the first level of realism is being simulated, then total bandwidth going into and out of the server may be high, approaching 20 Mb/sec in the case of 100 users. Where higher levels of realism are being simulated, due to higher per user computational loads, fewer users per chat room can be supported. As a result, the bandwidths going into and out of a server will be much lower. However, even in this case, the bandwidth will be too high for most current users to host a large chat room at home, unless the sound quality is significantly compromised by moving to low-bandwidth codecs. Most broadband connections are currently limited to less than 1 Mb/sec in both directions.

It has been found in the case of a large chat room, it is also possible to distribute the work to several servers, such as the Internet host servers 102-2 through N. This is because just a small number of users are likely to be speaking at the same time (or all but the closest few can be ignored to reduce computational demands). Each server simulating a room will need to see the single voice channel of each speaking user (or those nearby), but binaural sound simulations need to be generated just for a subset of the users. In this way a large number of users in a single chat room may be partitioned among multiple servers.

In a further embodiment, the work of the server may be completely distributed among all the users; i.e., among the personal computers 106-1 through N. Here, each user receives the voice of all other speaking users in the chat room (or those nearby), and simulates the sound field for binaural representation for just that user. In this decentralized embodiment, limiting audio downloads to the closest four speaking users could limit download bandwidth to 260 Kb/sec or less, even with high-quality compression. Limitations on audio upload bandwidth should also be considered. In some cases where many people are speaking near a speaking user, either multicasting or some other efficient networking technique would be used, or the maximum number of listening users may need to be limited.

From the above, it will be evident that the computer system for the chat room spatial audio system 100 comprises all the various computer systems where the necessary processing for the present invention can be carried out any place within the system.

Figure 3:
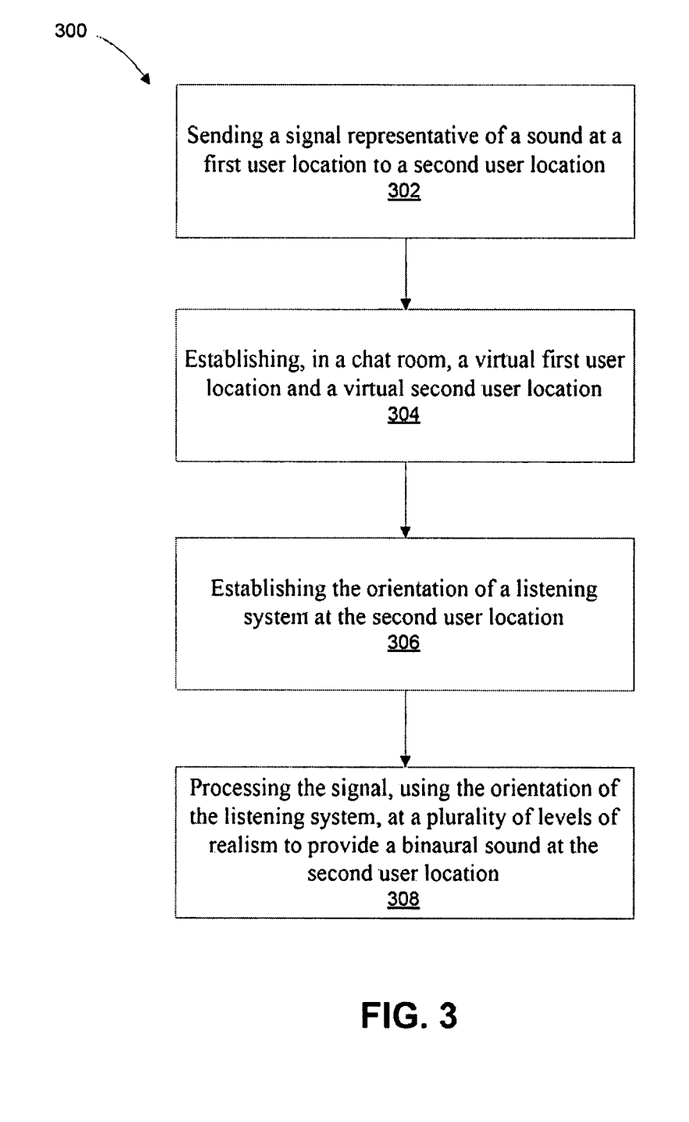
FIG. 3 is a system providing chat room spatial audio according to an embodiment of the present invention.

Referring now to FIG. 3, therein is shown a system 300 providing chat room spatial audio according to an embodiment of the present invention. The system includes: sending a signal representative of a sound at a first user location to a second user location in a block 302; establishing, in a chat room, a virtual first user location and a virtual second user location in a-block 304; establishing the orientation of a listening system at the second user location in a block 306, and processing the signal, using the orientation of the listening system, at a plurality of levels of realism to provide a binaural sound at the second user location having an analogous spatial relationship between the second user location and the first user location as the virtual spatial relationship between the virtual second user location and the virtual first user location in a block 308. The system 300 replicates the Cocktail Party Effect in a virtual chat room.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the scope of the included claims. All matters set forth herein or shown in the accompanying drawings are to be interpreted in an illustrative and non-limiting sense.

The invention claimed is:

1. A chat room method comprising:
sending a signal representative of a sound at a first user location to a second user location;
establishing, in a chat room, a first user at a virtual first user location and a second user at a virtual second user location, wherein chat room acoustics are a function of a number of users in the chat room such that increasing the number of users in the chat room reduces accuracy of a sound field simulated in the chat room;
processing the signal at one or more of a plurality of levels of realism related to sound to provide a binaural sound at the second user location having an analogous spatial relationship between the second user location and the first user location as a virtual spatial relationship between the virtual second user location and the virtual first user location; and
selecting a level of realism from the plurality of levels of realism related to sound based on at least one of a number of users in the chat room and a load on computational resources hosting the chat room system,
wherein for a first number of users a first level of realism is selected, processing the signal comprises using a frequency-independent sound model with frequencies that are attenuated or delayed,
wherein for a second number of users that is less than the first number of users a second level of realism is selected, processing the signal comprises using a frequency-dependent sound model with frequencies that are attenuated or delayed, and
wherein for a third number of users that is less than the second number of users a third level of realism is selected, processing the signal comprises using a reflection sound model, wherein a reflection from a structure or object is calculated.

2. The method as claimed in claim 1 further comprising:
sending a plurality of signals representative of additional user locations to the second user location;
establishing, in the chat room, virtual additional user locations; and
processing less than all the plurality of signals to provide the binaural sound.

3. The method as claimed in claim 1 further comprising:
sending a plurality of signals representative of additional user locations to the second user location;
establishing, outside the chat room, virtual additional user locations;
establishing an entry into the chat room; and
processing less than all the plurality of signals and simulating sound through the entry into the chat room to provide the binaural sound.

4. The method as claimed in claim 1 further comprising:
sending a plurality of signals representative of additional user locations to the second user location; and
processing the plurality of signals to provide the binaural sound at one of a plurality of levels of realism using head-related transfer functions and to convolve the plurality of signals at different levels of accuracy.

5. The method as claimed in claim 1 further comprising:
sending a plurality of signals representative of additional user locations to the second user location; and
processing the plurality of signals to provide the binaural sound at one of the plurality of levels of realism using the reflection sound model for at least one of less than all of the plurality of signals, less than full accuracy modeling of all of the plurality of signals, and a combination thereof.

6. The method as claimed in claim 1 wherein processing the signal further comprises echo cancellation for sound at the second user location due to sound from the second user location to the first user location and back to the second user location.

7. The method as claimed in claim 1 further comprising:
sending a plurality of signals representative of additional user locations to the second user location;
establishing, in a chat room, virtual additional user locations representative of the additional user locations; and
establishing a cone of silence around the virtual second user location and at least one of the virtual additional user locations to allow signals just between the second user location and at least one of the additional user locations corresponding to the at least one of the virtual additional user locations.

8. The method of claim 1, wherein if the first level of realism is selected, processing the signal comprises using the frequency-independent sound model and not using the frequency-dependent sound model and the reflection sound model.

9. The method of claim 1, wherein if the second level of realism is selected, processing the signal comprises using both the first level and the second level of realism and not the third level of realism.

10. The method of claim 1, wherein if the third level of realism is selected, processing the signal comprises using the first level, the second level, and the third level of realism.

11. A chat room system comprising:
a sending system for sending a signal representative of a sound at a first user location to a second user location;
a listening system for providing binaural sound at the second user location; and
a computer system for establishing, in a chat room, wherein chat room acoustics are a function of a number of users in the chat room such that increasing the number of users in the chat room reduces accuracy of a sound field simulated in the chat room, a first user at a virtual first user location and a second user at a virtual second user location, the computer system for processing the signal at one or more of a plurality of levels of realism related to sound to provide the binaural sound at the second user location having an analogous spatial relationship between the second user location and the first user location as a virtual spatial relationship between the virtual second user location and the virtual first user location, and selecting a level of realism from the plurality of levels of realism related to sound based on at least one of a number of users in the chat room and a load on computational resources hosting the chat room system,
wherein for a first number of users a first level of realism is selected and the computer system uses a frequency-independent sound model to provide the binaural sound at the second user location with frequencies that are attenuated or delayed,
wherein for a second number of users that is less than the first number of users a second level of realism is selected and the computer system uses a frequency-dependent sound model to provide the binaural sound at the second user location with frequencies that are attenuated or delayed, and wherein for a third number of users that is less than the second number of users a third level of realism is selected and the computer system uses a reflection sound model to provide the binaural sound at the second user location, wherein a reflection from a structure or object is calculated.

12. The system as claimed in claim 11 further comprising:

additional computer systems for sending a plurality of signals representative of additional user locations to the second user location and for establishing, in the chat room, a plurality of additional user locations each providing a plurality of signals; and the computer system is for processing less than all the plurality of signals to provide the binaural sound.

13. The system as claimed in claim 11 further comprising:

additional computer systems for:

sending a plurality of signals representative of additional user locations to the second user location;

establishing, outside the chat room, virtual additional user locations;

establishing an entry into the chat room; and the computer system for processing less than all the plurality of signals and simulating sound through the entry into the chat room to provide the binaural sound.

14. The system as claimed in claim 11 wherein the computer system further provides for processing the signal at one of the plurality of levels of realism using a sound model calculating at least one of:

an interaural time difference, an interaural level difference, an angle-dependent output level, a distance level dependence;

a head-related transfer function, a human voice transfer function, a distance sound transmission transfer function; and a combination thereof.

15. The system as claimed in claim 11 further comprising:

additional computer systems for sending a plurality of signals representative of additional user locations to the second user location; and the additional computer systems processing the plurality of signals to provide the binaural sound at one of a plurality of levels of realism using head-related transfer functions and to convolve the plurality of signals at different levels of accuracy.

16. The system as claimed in claim 11 wherein the computer system further provides for processing the signal at one of the plurality of levels of realism and uses at least one of:

an interaural time difference, an interaural level difference, an angle-dependent output level, a distance level dependence;

a head-related transfer function processing for a second level of processing;

a head-related transfer function, a human voice transfer function, a distance sound transmission transfer function;

chat room reflection modeling, human torso reflection modeling, a multiple reflection; and a combination thereof.

17. The system as claimed in claim 11 further comprising:

additional computer systems for sending a plurality of signals representative of sounds at a plurality of additional user locations to the second user location; and the computer system for processing the plurality of signals to provide the binaural sound at one of the plurality of levels of realism using at least one of chat room reflection modeling for at least one of less than all of the plurality of signals, less than full accuracy modeling of all of the plurality of signals, and a combination thereof.

18. The system as claimed in claim 11 wherein the computer system further provides for echo cancellation for sound at the second user location due to sound from the second user location to the first user location and back to the second user location.

19. The system as claimed in claim 11 further comprising:

additional computer systems for:

sending a plurality of signals representative of sounds at a plurality of additional user locations to the second user location;

for establishing, in a chat room, virtual additional user locations representative of the plurality of additional user locations; and the computer system for establishing a cone of silence around the virtual second user location and at least one of the virtual additional user locations to allow signals just between the second user location and the at least one of the additional user locations corresponding to the at least one of the virtual additional user locations.

20. The system of claim 11, wherein if the first level of realism is selected, processing the signal comprises using the frequency-independent sound model and not using the frequency-dependent sound model and the reflection sound model.

21. The system of claim 11, wherein if the second level of realism is selected, processing the signal comprises using both the first level and the second level of realism and not the third level of realism.

22. The system of claim 11, wherein if the third level of realism is selected, processing the signal comprises using the first level, the second level, and the third level of realism.

* * * * *